(12) United States Patent
Vas et al.

(10) Patent No.: US 11,718,308 B2
(45) Date of Patent: Aug. 8, 2023

(54) COMMERCIAL VEHICLE AND METHOD OF OPERATING A COMMERCIAL VEHICLE

(71) Applicant: FORD GLOBAL TECHNOLOGIES, LLC, Dearborn, MI (US)

(72) Inventors: Kilian Vas, Düsseldorf (DE); Jonathan Berkemeier, Bonn (DE); Friederike Philipsenburg, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 135 days.

(21) Appl. No.: 17/475,450

(22) Filed: Sep. 15, 2021

(65) Prior Publication Data

US 2022/0097718 A1 Mar. 31, 2022

(30) Foreign Application Priority Data

Sep. 28, 2020 (DE) .......................... 102020212149.4

(51) Int. Cl.
  *B60W 40/13* (2012.01)
  *B60G 17/0165* (2006.01)
  *B60W 50/14* (2020.01)

(52) U.S. Cl.
  CPC ......... *B60W 40/13* (2013.01); *B60G 17/0165* (2013.01); *B60W 50/14* (2013.01);
  (Continued)

(58) Field of Classification Search
  CPC ................. B60W 40/13; B60W 50/14; B60W 2040/1307; B60W 2050/146; B60W 2510/22; B60G 17/0165
  See application file for complete search history.

(56) References Cited

U.S. PATENT DOCUMENTS 7,612,303 B1 * 11/2009 Floyd ..................... G01G 19/10
  177/141
10,093,230 B1 * 10/2018 Anderson ................ B60Q 3/80
(Continued)

FOREIGN PATENT DOCUMENTS

DE    102004032729 A1    2/2006
DE    102013004537 A1 *  9/2013   ............. G06Q 10/08
(Continued)

OTHER PUBLICATIONS

Diederichsmeier, English language translation of DE102013004537A1, 2013, Espacenet (Year: 2013).*

*Primary Examiner* — Yazan A Soofi
*Assistant Examiner* — Naeem Taslim Alam
(74) *Attorney, Agent, or Firm* — Frank Lollo; MacMillan, Sobanski & Todd, LLC (57) ABSTRACT

A commercial vehicle with a cargo space includes a detection unit for detecting movement of a wheel suspension and/or an inertial measuring unit for detecting movements of a sprung mass of the vehicle in order to evaluate a loading state of cargo in the cargo space. To provide improved cargo capacity, improved user-friendliness, and improved driving behavior, the commercial vehicle has an optical signaling unit arranged in the cargo space which is electrically activatable using an evaluation electronics unit, wherein the evaluation electronics unit is configured to activate the signaling unit on the basis of signals of the detection unit and/or the inertial measuring unit which are generated upon placement of the cargo on a cargo surface of the cargo space in such a way that an optimum position of the cargo surface is displayable by means of the signaling unit.

20 Claims, 4 Drawing Sheets

(52) U.S. Cl.
CPC ............... *B60W 2040/1307* (2013.01); *B60W 2050/146* (2013.01); *B60W 2510/22* (2013.01)

(56) References Cited

U.S. PATENT DOCUMENTS

| | | | |
|---|---|---|---|
| 10,464,106 B1* | 11/2019 | Mo | ........................ B65G 67/20 |
| 2018/0113480 A1* | 4/2018 | Lota | ........................ B60R 5/04 |
| 2019/0043004 A1* | 2/2019 | Lesieur | ................. G06T 15/005 |
| 2020/0030985 A1* | 1/2020 | Lisso | ..................... B25J 9/0018 |
| 2021/0048333 A1* | 2/2021 | Zhang | ....................... B60T 7/22 |
| 2021/0090005 A1* | 3/2021 | Dholakia | ................. G06T 7/521 |
| 2022/0066063 A1* | 3/2022 | Goh | ..................... G01V 5/0083 |

FOREIGN PATENT DOCUMENTS

| | | |
|---|---|---|
| DE | 102013004537 A1 | 9/2013 |
| DE | 102014001031 A1 | 7/2015 |

* cited by examiner

COMMERCIAL VEHICLE AND METHOD OF OPERATING A COMMERCIAL VEHICLE

CROSS REFERENCE TO RELATED APPLICATIONS

This application claims priority to application DE102020212149.4, filed in the German Patent and Trademark Office on Sep. 28, 2020, which is incorporated herein by reference in its entirety.

STATEMENT REGARDING FEDERALLY SPONSORED RESEARCH

Not Applicable.

BACKGROUND OF THE INVENTION

The invention relates to a commercial vehicle having at least one cargo space, at least one detection unit for detecting compression travels on at least one wheel suspension of the commercial vehicle, at least one inertial measuring unit for detecting movements of a sprung mass of the commercial vehicle, and at least one evaluation electronics unit for evaluating signals of the detection unit and the inertial measuring unit. Moreover, the invention relates to a method for operating a commercial vehicle.

For users of commercial vehicles who wish to transport larger amounts of cargo, a maximum cargo capacity and a high level of user-friendliness are main deciding factors in the selection of a specific commercial vehicle. An overall weight distribution and axle load upper limits (and the resulting commercial vehicle dynamic response and drivability of the commercial vehicle) are factors restricting the cargo capacity of a commercial vehicle.

Incorrectly arranging a heavy cargo on a cargo floor of a cargo space of a utility vehicle can result in extreme loads of commercial vehicle systems, for example, causing unbalanced loads on the chassis or vehicle body parts.

To make a cargo space of a utility vehicle more user-friendly, a margin is typically taken into consideration in axle load calculations in order to handle the non-optimum positioning of a cargo on the cargo floor of the commercial vehicle, however this may reduce the total cargo capacity of the commercial vehicle.

In some situations, a user of a commercial vehicle simply does not know the optimum position of a cargo on the cargo floor of the cargo space, since the user may not have read the user handbook or does not know the exact weights of his cargo objects, which can result in an uneven weight distribution in the cargo space.

Published patent application DE102013004537A1 discloses a device for cargo monitoring of a vehicle. The device has a detection unit for detecting a size or a weight of a cargo material and an output unit for outputting a weight-dependent or size-dependent optimum position of the cargo material inside a cargo space of the vehicle.

SUMMARY OF THE INVENTION

It is one object of the invention to provide a commercial vehicle having improved cargo capacity, improved user-friendliness, and improved driving behavior.

In an aspect of the invention, a commercial vehicle has at least one optical signaling unit, which is arranged in the cargo space and is electrically activatable using an evaluation electronics unit, wherein the evaluation electronics unit is configured to activate the signaling unit on the basis of signals of a detection unit and/or an inertial measuring unit which are generated upon placement of a cargo on a cargo surface of the cargo space. The evaluation electronics unit 1) determines an optimum position of the cargo in response to the loading state of the cargo (e.g., the relative load forces applied to front and rear axles), and 2) activates the light sources in such a way that the optimum position of the cargo on the cargo surface is indicated (i.e., displayed) by the signaling unit.

It is to be noted that the features and measures set forth individually in the following description can be combined with one another in any technically reasonable manner and disclose further embodiments of the invention. The description additionally characterizes and specifies the invention in particular in conjunction with the figures.

In another aspect of the invention, a vehicle which defines at least one cargo space comprises a sensor unit configured to determine load forces at front and rear axles of the vehicle. An evaluation electronics unit is configured to evaluate signals from the sensor unit to determine a loading state. An optical signaling unit with a plurality of light sources arranged in the cargo space and electrically activatable by the evaluation electronics unit. The evaluation electronics unit is configured such that when a cargo is placed on a cargo surface of the cargo space then the evaluation electronics unit 1) determines an optimum position of the cargo in response to the loading state, and 2) activates the light sources in such a way that the optimum position of the cargo is indicated.

In another aspect of the invention, a method is provided for balancing a cargo in a cargo space of a vehicle. The method comprises the steps of sensing load forces at front and rear axles of the vehicle, determining a loading state of the vehicle in response to the load forces, determining an optimum position of the cargo in response to the loading state, and activating an optical signaling unit with a plurality of light sources arranged in the cargo space, wherein the light sources are activated in such a way that the optimum position of the cargo is indicated.

Measurement signals of the detection unit for detecting compression movement or displacement (e.g., travel or height) of a suspension and/or measurement signals of the inertial measuring unit for detecting orientation or movement (e.g., tilt) of the sprung mass of the utility vehicle are evaluated to display the optimum position of the cargo on the cargo surface of the cargo space. Thus, measurement signals can be derived from sensor units which may already be installed in a commercial vehicle for other conventional purposes, for example, to implement a level regulation or an ABS or ESP system. Therefore, the invention may be implemented in a relatively cost-effective way.

If a user of a commercial vehicle wishes to load it with a cargo, the user first places the cargo anywhere on the cargo surface. Due to the load of this placement of the cargo on the cargo surface, the frame and body of the commercial vehicle deflects (i.d., drops) at at least one wheel suspension, which is detected as a compression movement or also as a deflection movement by means of the detection unit. Due to this deflection of the commercial vehicle, the sprung mass of the commercial vehicle can moreover be tilted, which is detected by means of the inertial measuring unit. The evaluation electronics unit ascertains therefrom (e.g., from the suspension deflection and/or from the tilting of the sprung mass which vary from their ideal conditions) an optimum position of the cargo on the cargo surface and activates the optical signaling unit in such a way that the optimum position of the cargo on the cargo surface is displayed by means of the signaling unit. The user thus does not have to ascertain or guess for himself where an optimum position of the cargo on the cargo surface is located, which would generally also only be a rough approximation.

Due to improved positioning of the cargo at the optimum position of the cargo on the cargo surface, the weight of cargo is distributed very uniformly inside the cargo space, whereby the cargo capacity of the commercial vehicle is maximized, the user-friendliness of the commercial vehicle is improved, and the driving behavior of the commercial vehicle is improved, without changes having to be made on the chassis, in particular on axle plates, of the commercial vehicle. The cargo capacity of a given commercial vehicle can thus be maximized by means of the invention without further structural changes being performed on the commercial vehicle, which reduces costs.

The optical signaling unit is preferably permanently installed in the cargo space of the commercial vehicle. The signaling of the optimum position of the cargo on the cargo surface can be by means of the signaling unit, for example, by way of color signaling, signaling via light intensities, and/or signaling via spatial location of light sources.

The evaluation electronics unit can be a separate unit or can be implemented by a software implementation according to the invention in an existing vehicle electronics unit. The evaluation electronics unit can have at least one microprocessor, using which at least one evaluation algorithm is executable.

The detection unit for detecting compression movements of the suspension can be a component of a level regulation system operating in the commercial vehicle. The detection unit can also be configured for detecting compression movement on two or more, in particular all wheel suspensions of the commercial vehicle.

The inertial measuring unit for detecting movements of the sprung mass of the commercial vehicle has a spatial combination of multiple inertial sensors, such as acceleration sensors (i.e., accelerometers) and rotation rate sensors. To detect the six possible kinematic degrees of freedom, the inertial measuring unit can have three acceleration sensors (translation sensors) orthogonal to one another for detecting the translational movement in the x and/or y and/or z direction and three rotation rate sensors (gyroscopic sensors) attached orthogonally to one another for detecting rotational movements around the x and/or y and/or z direction. Such an inertial measuring unit supplies as measured values, three linear acceleration values for the translational movement and three angular velocities for the rotation rates.

The commercial vehicle can be designed, for example, as a panel van, flatbed truck, van, or truck.

According to one advantageous embodiment, the signaling unit has at least one light bar, which is arranged in the cargo space extending in a longitudinal direction of the commercial vehicle, having multiple light sources arranged in series in relation to one another. Using the multiple light sources, at least two different light colors can alternately be generated, wherein the activation electronics unit is configured to activate the signaling unit on the basis of signals of the detection unit and/or the inertial measuring unit, which are generated upon placement of a cargo on a cargo surface of the cargo space, in such a way that the optimum position can be indicated by means of a single light source or a subgroup of light sources generating light in a defined signaling light color. In particular, the optimum position of the cargo on the cargo surface with respect to the longitudinal direction of the commercial vehicle may be displayed by means of the light bar. One light color which can alternately be generated using the respective light source is the defined signaling light color, which can be, for example, a green signaling light color. A further light color which can be alternately generated using the respective light source can be, for example, a white illumination light color for illuminating the cargo space. Alternatively, the further light color can be a red or orange warning light color which can be used to indicate an incorrect longitudinal position of the cargo on the cargo surface. The signaling of the optimum position of the cargo on the cargo surface can be carried out by means of a single light source or by means of a subgroup made up of multiple light sources arranged in series in relation to one another. The individual light sources can be designed, for example, as LED light sources.

A further advantageous embodiment provides that the light bar is arranged on a ceiling or a side wall of the cargo space. The selection of the position of the light bar inside the cargo space is preferably carried out depending on the visibility of the cargo space, in particular if a cargo is already located therein.

According to a further advantageous embodiment, each light source is configured to alternately generate a white illumination light color or, as the defined signaling light color, a green signaling light color. The white illumination light color is used for illuminating the cargo space. The green signaling light color is used for signaling the optimum position of the cargo on the cargo surface.

According to a further advantageous embodiment, each light source is configured to alternately generate a red warning light color. The red warning light color is used for signaling an incorrect position of the cargo on the cargo surface.

A further advantageous embodiment provides that the light sources are LED light sources. The light bar can be operated with lower electrical power consumption in this way and is moreover designed to be robust and long-lived.

According to a further advantageous embodiment, the activation electronics unit is configured to ascertain on the basis of measurement signals of the detection unit and/or the inertial measuring unit whether the cargo is positioned at the optimum position and to activate the signaling unit in such a way that all light sources generate the defined signaling light color when the cargo is positioned or re-positioned at the optimum position. In this way, the user receives very well perceivable information that the cargo has been arranged at the optimum position on the cargo surface.

According to a further advantageous embodiment, the activation electronics unit is configured to activate the signaling unit in such a way that all light sources generate the green illumination light color when the cargo is positioned at least for a time period of predetermined length of, for example, five seconds at the optimum position. After it has been displayed to the user, for example, by means of the green signaling light color, for example, also for a duration of five or also only two or three seconds of all light sources that the cargo has been arranged at the optimum position on the cargo surface, the light bar can thus automatically be used again for normal ambient illumination of the cargo space.

A further advantageous embodiment provides that the commercial vehicle has at least one sensor unit for detecting whether at least one cargo space hatch of the commercial vehicle is in a closed state and for generating an open signal if the cargo space hatch is not in the closed state. Accordingly, an ascertainment operation of the activation electronics unit, in which the activation electronics unit ascertains an optimum position of a cargo placed on the cargo surface, is activatable by means of the open signal. In this way, the ascertainment operation of the activation electronics unit is thus automatically activated when the cargo space hatch, for example, a rear hatch or a lateral sliding door, has been moved into an open state. This can be detected, for example, by means of vehicle sensors (e.g., displacement sensors of limit switches) which are conventionally already present.

According to a further advantageous embodiment, the commercial vehicle has at least one unit for detecting whether the commercial vehicle is in a driving operation, and for generating a driving signal when the commercial vehicle is in the driving operation, wherein an ascertainment operation of the activation electronics unit, in which the activation electronics unit ascertains an optimum position of a cargo placed on the cargo surface, is deactivatable by means of the driving signal. In this way, the ascertainment operation of the activation electronics unit is thus automatically deactivated when the commercial vehicle is in a driving operation, e.g., is driving. The unit for detecting whether the commercial vehicle is in a driving operation can be, for example, a unit conventionally already installed in a commercial vehicle.

According to a further advantageous embodiment, the activation electronics unit is configured to generate an information signal as long as the cargo is not positioned at the optimum position on the cargo surface, and to output the information signal after receiving the driving signal to a data interface for communication with a mobile wireless network. If a user of the commercial vehicle drives the vehicle without the cargo being located at the optimum position on the cargo surface, the commercial vehicle is not being used optimally or not as directed. This type of misuse of the commercial vehicle can be reported by means of the information signal via the mobile wireless network to a commercial vehicle fleet operator operating the commercial vehicle, for example, to be able to display such a misuse to the fleet operator.

A further advantageous embodiment provides that the commercial vehicle has at least one display unit arranged in a driver compartment of the commercial vehicle, using which at least one item of information on the present loading state of the cargo space is displayable on the basis of signals of the activation electronics unit. In this way, the present loading state of the cargo space can be displayed to the driver of the commercial vehicle. The associated information can be, for example, a camera image or a schematic illustration of the cargo space. Alternatively, this information can be varied corresponding to the light bar by various light colors of a light source or a light panel of the display unit.

According to a further advantageous embodiment, the activation electronics unit is configured to monitor a present loading state of the cargo space during a driving operation of the commercial vehicle and to generate and output a warning signal if the present loading situation of the cargo space changes during the driving operation. In this way, it can be displayed to the driver of the commercial vehicle during a journey with the commercial vehicle whether a cargo has slipped within the cargo space and has thus left its optimum position. The driver can then stop in order to position the cargo optimally on the cargo surface again.

According to a further advantageous embodiment, the commercial vehicle has at least one driver assistance system which is settable on the basis of signals of the activation electronics unit. In this way, the driver assistance system can be adjusted automatically to the respective loading state of the commercial vehicle to be able to ensure an optimum operation of the driver assistance system or an optimum driving behavior of the commercial vehicle.

A further advantageous embodiment provides that the commercial vehicle has at least one data interface for communication with a mobile terminal (e.g., cellular telephone) or with a mobile wireless network. In this way, an item of information on the present loading state of the cargo space can be displayed to the user of the commercial vehicle on the mobile terminal. This can be provided in particular if no above-mentioned display unit is present in the driver compartment of the commercial vehicle. Items of information on the present loading state of the cargo space can also be relayed via the mobile wireless network to a fleet operator via the data interface to enable this operator to optimize delivery routes.

According to a further advantageous embodiment, the commercial vehicle has at least one engine controller, wherein the activation electronics unit is configured to generate and output a shutdown signal when the cargo is not positioned at the optimum position on the cargo surface, and the engine controller is configured to turn off an ignition of the commercial vehicle after receiving the shutdown signal. In this way, it is impossible for a driver of the commercial vehicle to start an engine of the commercial vehicle when the cargo is not at the optimum position on the cargo surface.

The above objects are moreover achieved by a method having the steps of placing a cargo on a cargo surface of the cargo space, detecting compression movements on at least one wheel suspension of the commercial vehicle and movements of a sprung mass of the commercial vehicle, ascertaining an optimum position of the cargo on the cargo surface on the basis of the compression movement and/or the movements, and displaying the optimum position inside the cargo space using an optical signaling unit.

The advantages mentioned above with reference to the commercial vehicle are linked accordingly to the method. In particular, the commercial vehicle according to one of the above-mentioned embodiments or a combination of at least two of these embodiments with one another can be used to carry out the method.

According to one advantageous embodiment, the signaling unit is activated in such a way that the optimum position is displayed by means of a single light source or a subgroup of light sources of a light bar arranged in the cargo space extending in a longitudinal direction of the commercial vehicle, having multiple light sources arranged in series in relation to one another, using each of which at least two different light colors can be alternately generated, in a defined signaling light color. The advantages mentioned above with reference to the corresponding embodiment of the commercial vehicle are correspondingly linked to this embodiment.

A further advantageous embodiment provides that a white illumination light color is generated by all light sources when the cargo is positioned at least for a time period of predetermined length at the optimum position. The advantages mentioned above with reference to the corresponding embodiment of the commercial vehicle are correspondingly linked to this embodiment.

According to a further advantageous embodiment, it is detected whether at least one cargo space hatch of the commercial vehicle is in a closed state and an open signal is generated when the cargo space hatch is not in the closed state, wherein an ascertainment of an optimum position of a cargo placed on the cargo surface is activated by means of the open signal. The advantages mentioned above with reference to the corresponding embodiment of the commercial vehicle are correspondingly linked to this embodiment.

According to a further advantageous embodiment, it is detected whether the commercial vehicle is in a driving operation, and a driving signal is generated when the commercial vehicle is in the driving operation, wherein an ascertainment of an optimum position of a cargo placed on the cargo surface is deactivated by means of the driving signal. The advantages mentioned above with reference to the corresponding embodiment of the commercial vehicle are correspondingly linked to this embodiment.

A further advantageous embodiment provides that the present loading state of the cargo space is ascertained during the driving operation of the commercial vehicle and a warning signal is generated if the present loading state of the cargo space changes during the driving operation. The advantages mentioned above with reference to the corresponding embodiment of the commercial vehicle are correspondingly linked to this embodiment.

According to a further advantageous embodiment, at least one information signal is generated as long as the cargo is not positioned at the optimum position on the cargo surface, and the information signal is transmitted, after reception of the driving signal, via a mobile wireless network to a central (e.g., vehicle manufacturer's) database. The advantages mentioned above with reference to the corresponding embodiment of the commercial vehicle are correspondingly linked to this embodiment.

According to a further advantageous embodiment, at least one item of information on the present loading state of the cargo space is displayed in a driver compartment of the commercial vehicle. The advantages mentioned above with reference to the corresponding embodiment of the commercial vehicle are correspondingly linked to this embodiment.

A further advantageous embodiment provides that at least one driver assistance system is set depending on a present loading state of the cargo space. The advantages mentioned above with reference to the corresponding embodiment of the commercial vehicle are correspondingly linked to this embodiment.

According to a further advantageous embodiment, at least one item of information on the present loading state of the cargo space is transmitted to a mobile terminal or via a mobile wireless network to a central database. The advantages mentioned above with reference to the corresponding embodiment of the commercial vehicle are correspondingly linked to this embodiment.

According to a further advantageous embodiment, a shutdown signal is generated when the cargo is not positioned at the optimum position on the cargo surface, and an ignition of the commercial vehicle is turned off as long as the shutdown signal is generated. The advantages mentioned above with reference to the corresponding embodiment of the commercial vehicle are correspondingly linked to this embodiment.

It is within the meaning of the invention to also use it for a display of an overload of front and/or rear axle. In the event of an overload, the signaling unit could generate, for example, a flashing signal, preferably a red flashing signal, whereby the overloading of the front and/or rear axle is directly displayable. The flashing can appear continuously or can also appear periodically, wherein the display unit is activated accordingly at the same time and/or corresponding data are transmitted to mobile terminals so that the overload is displayed to the vehicle user. The starting of the engine can also be prevented in the event of overload.

DETAILED DESCRIPTION OF PREFERRED EMBODIMENTS

Figure 1:
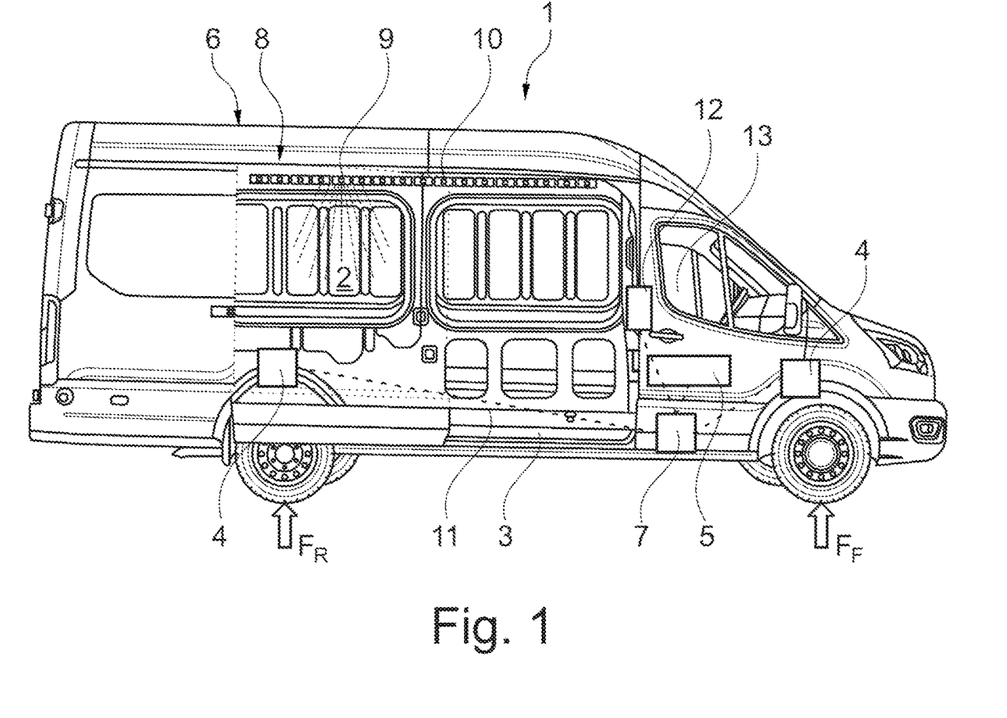
FIG. 1 is a schematic illustration of an exemplary embodiment of a commercial vehicle according to the invention in the unloaded state.

In the different figures, identical parts are always provided with the same reference signs, because of which they are generally also only described once. The colors mentioned hereinafter are shown as beams in the figures. FIG. 1 shows a schematic illustration of an exemplary embodiment of a commercial vehicle 1 according to the invention in the form of a van in an unloaded state.

The commercial vehicle 1 has a cargo space 2, which is accessible via a lateral opening 3 and a rear opening (not shown). The lateral opening 3 is closable by means of a lateral cargo space hatch (not shown) in the form of a sliding door. The cargo space 2 is additionally shown partially laterally open in FIGS. 1 to 3 to be able to better illustrate the invention.

The commercial vehicle 1 has, for each wheel suspension, a detection unit 4 for detecting compression movement (e.g., vertical travel or displacement) on the respective wheel suspension. Moreover, the commercial vehicle 1 has an inertial measuring unit 5 for detecting movements of a sprung mass 6 of the commercial vehicle 1.

In addition, the commercial vehicle 1 has an evaluation electronics unit 7 for evaluating signals of the detection units 4 and the inertial measuring unit 5.

Furthermore, the commercial vehicle 1 has an optical signaling unit 8, which is arranged in the cargo space 3 and is electrically activatable using the evaluation electronics unit 7. The signaling unit 8 has a light bar 9, which is arranged in the cargo space 2 extending in a longitudinal direction of the commercial vehicle 1, having multiple light sources 10 arranged in series in relation to one another. Using light sources 10, three different light colors may be alternately generated. In the figures, the different signaling colors are represented as beams of different line types. However, the individual light sources 10 are shown which are activated so that the different signaling colors are generated. The light bar 9 may be arranged on a ceiling of the cargo space 2. Each light source 10 can alternately generate a white illumination light color (represented by no beams), a red signaling light color as a warning light color (represented by dotted beams), or a green signaling light color (represented by dashed beams). The light sources 10 may be LED light sources. In the unloaded state from FIG. 1, some light sources 10 (a subgroup) may be used to generate the white illumination light color (no beams), while a smaller subgroup of the light sources 10 may be used to generate a green signaling color (dashed beams), since an incorrect loading or overloading also cannot exist in the unloaded state.

Figure 2:
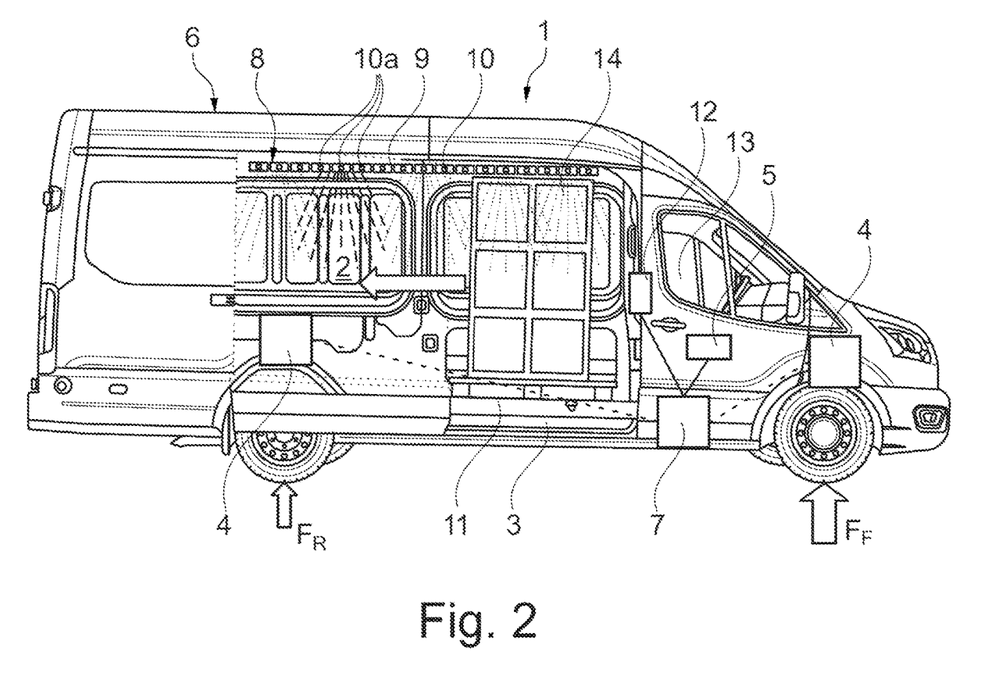
FIG. 2 is a schematic illustration of the commercial vehicle shown in FIG. 1 being loaded in an incorrectly loaded state.
Figure 3:
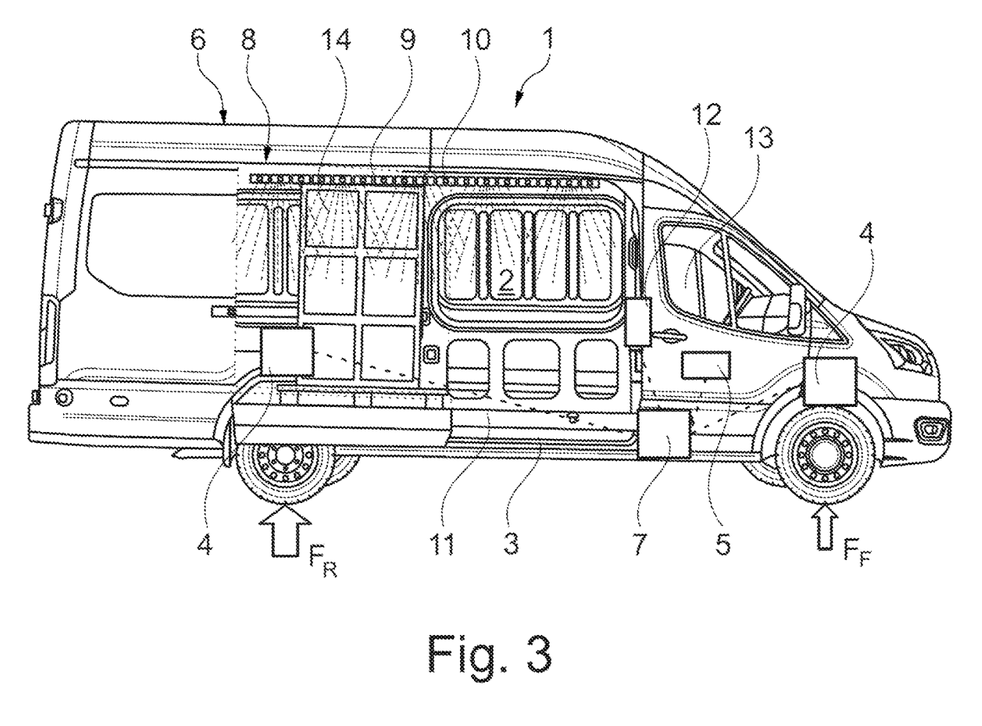
FIG. 3 shows a schematic illustration of the commercial vehicle shown in FIG. 1 in a correctly loaded state.

The evaluation electronics unit 7 can activate the signaling unit 8 on the basis of signals of the detection units 4 and/or the inertial measuring unit 5, which are generated when a cargo shown by way of example in FIGS. 2 and 3 is placed on a cargo surface 11 of the cargo space 2, in such a way that an optimum position of the cargo on the cargo surface 11 is displayable by means of the signaling unit 8, as shown in FIG. 2. In this case, the activation electronics unit 7 can activate the signaling unit 8 on the basis of signals of the detection units 4 and/or the inertial measuring unit 5, which are generated upon placement of the cargo on the cargo surface 11 of the cargo space 2, in such a way that the optimum position can be signaled by means of a single light source 10 or a subgroup of light sources 10 in a defined signaling light color in the form of the green signaling light color (dashed beams), as shown in FIG. 2. For example, a region having green signaling color (dashed beams) is displayed, which is surrounded by regions of red signaling light color (dotted beams), so that the correct cargo position is displayed.

In this case, the activation electronics unit 7 ascertains on the basis of measurement signals of the detection units 4 and/or the inertial measuring unit 5 whether the cargo is positioned at the optimum position and activates the signaling unit 8 in such a way that all light sources 10 generate the green signaling light color (dashed beams) when the cargo is positioned at the optimum position. This is shown in FIG. 3. The activation electronics unit 7 moreover activates the signaling unit 8 in such a way that all light sources 10 generate the white illumination light color (no beams) when the cargo is positioned at least for a time period of predetermined length at the optimum position.

The commercial vehicle 1 moreover has a sensor unit 12 for detecting whether the lateral cargo space hatch of the commercial vehicle 1 is in a closed state, and for generating an open signal when the lateral cargo space hatch is not in the closed state, as shown in FIGS. 1 to 3. An ascertainment operation of the activation electronics unit 7 in which the activation electronics unit 7 ascertains an optimum position of a cargo placed on the cargo surface 11 is automatically executed in response to the open signal.

Furthermore, the commercial vehicle 1 has a unit (not shown) for detecting whether the commercial vehicle 1 is in a driving operation, and for generating a driving signal when the commercial vehicle 1 is in the driving operation. In some embodiments, the ascertainment operation of the activation electronics unit 7, in which the activation electronics unit 7 ascertains an optimum position of a cargo placed on the cargo surface 11, is automatically deactivatable by means of this driving signal.

The activation electronics unit 7 can be configured to generate an information signal as long as the cargo is not positioned at the optimum position on the cargo surface 11, and to output the information signal after reception of the driving signal at a data interface (not shown) for communication with a mobile wireless network. The mobile wireless network is shown by way of example in FIG. 4 by means of schematically shown transmission waves and a schematically shown mobile terminal (e.g., cellular smartphone).

Figure 4:
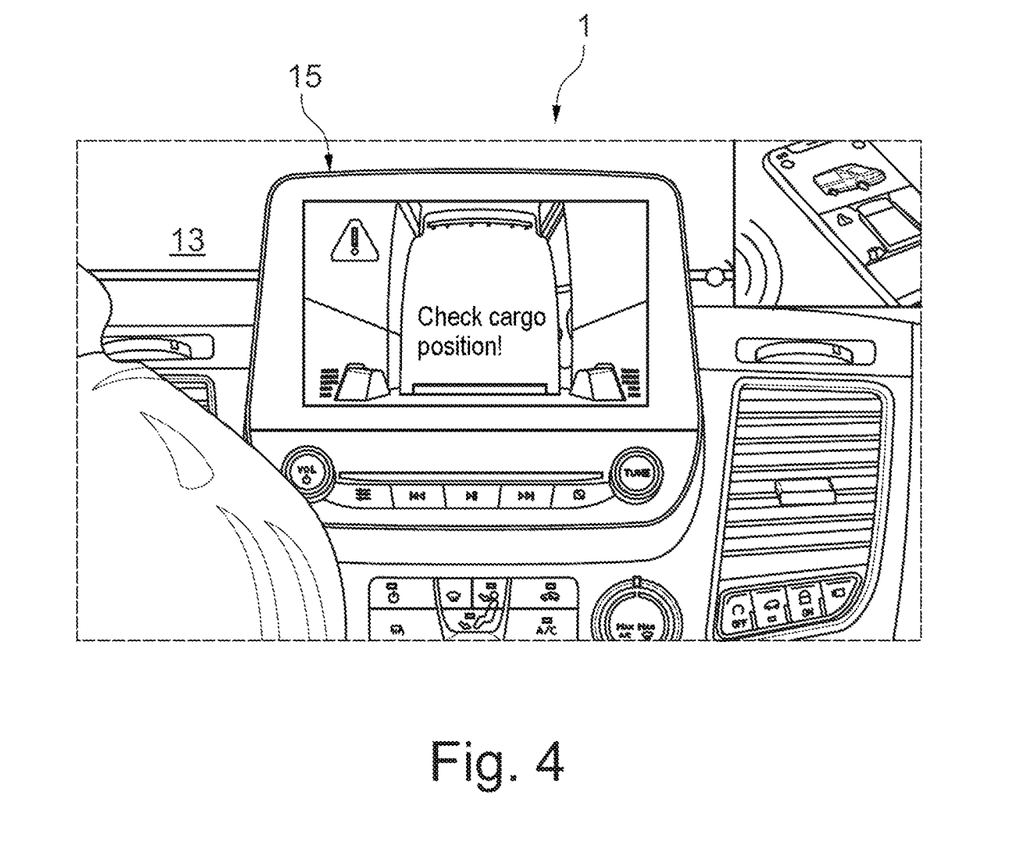
FIG. 4 shows a schematic illustration of a detail of a driver compartment of the commercial vehicle shown in FIGS. 1 to 3.

The commercial vehicle 1 moreover has a display unit 15, which is arranged in a driver compartment 13 of the commercial vehicle 1 and is shown in FIG. 4, using which at least one item of information on the present loading state of the cargo space 2 is displayable on the basis of signals of the activation electronics unit 7.

The activation electronics unit 7 can be configured to monitor the present loading state of the cargo space 2 during a driving operation of the commercial vehicle 1 and to generate and output a warning signal if the present loading situation of the cargo space changes during the driving operation.

The commercial vehicle 1 has at least one driver assistance system (not shown), which can be settable on the basis of signals of the activation electronics unit 7.

Moreover, the commercial vehicle 1 can have a data interface (not shown) for communication with the user-side mobile terminal or with the mobile wireless network.

Furthermore, the commercial vehicle 1 can have an engine controller (not shown), wherein the activation electronics unit 7 can be configured to generate and output a shutdown signal whenever the cargo is not positioned at the optimum position on the cargo surface 11, and the engine controller can be configured to turn off an ignition (not shown) of the commercial vehicle 1 after receiving the shutdown signal. The shutdown can be delayed until the commercial vehicle 1 is moved off of a roadway and into a parking location.

In FIG. 1, a rear axle load force $F_R$ and a front axle load force $F_F$ are indicated by arrows, wherein the width of the arrows in FIGS. 1 to 3 are shown proportional to the received loads in order to give an indication of the heaviness of the respective load.

FIG. 2 shows a schematic illustration of the commercial vehicle 1 shown in FIG. 1 in the incorrectly loaded state. A cargo 14 has been placed in a front region of the cargo surface 11 of the cargo space 2, whereby the front axle load force $F_F$ is significantly greater than the rear axle load force $F_R$, as displayed by the associated arrows. This loading state of the cargo space 2 is undesirable.

The activation electronics unit 7 therefore activates the signaling unit 8 on the basis of signals of the detection units 4 and/or the inertial measuring unit 5, which are generated upon placement of the cargo 14 on a cargo surface 11 of the cargo space 2, in such a way that an optimum longitudinal position of the cargo 14 on the cargo surface 11 is displayed by means of the signaling unit 8. The activation electronics unit 7 may, for example, determine the optimum position of the cargo 14 according to a desired difference between, and/or a ratio between, the magnitudes of the front axle load force $F_F$ and the rear axle load force $F_R$. The activation electronics unit 7 is configured to activate the signaling unit 8 on the basis of signals of the detection units 4 and/or the inertial measuring unit 5 in such a way that the optimum position is signaled by means of a subgroup made up of, for example, three light sources 10a in the defined signaling light color in the form of the green signaling light color (dashed beams). The region for optimum cargo positioning is thus recognizable. The activation electronics unit 7 is moreover configured to activate the remaining light sources 10 in such a way that the remaining light sources 10 generate the red warning light color (dotted beams). In this way, the signaling unit 8 displays to the user that the cargo 14 is to be positioned farther to the rear in the cargo space 2, specifically below the light sources 10a, where the optimum position of the cargo 14 is arranged on the cargo surface 11, which can be seen in FIG. 2 by means of the dashed beams.

FIG. 3 shows a schematic illustration of the commercial vehicle 1 shown in FIG. 1 in the correctly loaded state. For this purpose, first the cargo 14 has been displaced to the rear into the optimum position in accordance with the horizontally aligned arrow pointing in the direction toward the rear in FIG. 2. The activation electronics unit 7 recognizes or ascertains this on the basis of measurement signals of the detection units 4 and/or the inertial measuring unit 5 and activates the signaling unit 8 in such a way that all light sources 10 generate the green signaling light color (dashed beams). When the cargo 14 has been positioned at least for a time period of predetermined length at the optimum position and all light sources 10 have generated the green signaling light color for a correspondingly long time, the activation electronics unit 7 activates the signaling unit 8 in such a way that all light sources 10 generate a normal default color (e.g., the white illumination light color).

FIG. 4 shows a schematic illustration of a detail of a driver compartment 13 of the commercial vehicle 1 shown in FIGS. 1 to 3. In particular, the display unit 15 arranged in the driver compartment 13 is shown, using which at least one item of information on the present loading state of the cargo space shown in FIGS. 1 to 3 is displayable on the basis of signals of the activation electronics unit shown in FIGS. 1 to 3. The display unit 15 shows a camera image of the cargo space. Moreover, the display unit 15 can display to the driver by a colored marking (not shown in FIG. 4) and/or a warning message (e.g., text) that he should check the loading state of the cargo space.

What is claimed is:

1. A vehicle defining at least one cargo space, comprising:
   a sensor unit configured to determine load forces at front and rear axles of the vehicle;
   an evaluation electronics unit configured to evaluate signals from the sensor unit to determine a loading state; and
   an optical signaling unit with a plurality of light sources arranged in the cargo space and electrically activatable by the evaluation electronics unit;
   wherein the evaluation electronics unit is configured such that when a cargo is placed on a cargo surface of the cargo space then the evaluation electronics unit 1) determines an optimum position of the cargo in response to the loading state, and 2) activates the light sources in such a way that the optimum position of the cargo is indicated.

2. The vehicle of claim 1 wherein the sensor unit is comprised of a detection unit which measures a movement of at least one wheel suspension of the vehicle.

3. The vehicle of claim 1 wherein the sensor unit is comprised of an inertial measuring unit which detects movements of a sprung mass of the vehicle.

4. The vehicle of claim 1 wherein the signaling unit is comprised of a light bar which is arranged in the cargo space extending in a longitudinal direction of the vehicle, wherein the light bar has the plurality of light sources arranged in series in relation to one another, wherein the light sources are configured such that at least two different light colors can be alternately generated.

5. The vehicle of claim 4 wherein the evaluation electronics unit is configured to activate the signaling unit in such a way that the optimum position is indicated by a single light source of the plurality of light sources in a predetermined signaling light color.

6. The vehicle of claim 4 wherein the evaluation electronics unit is configured to activate the signaling unit in such a way that the optimum position is indicated by a subgroup made up of respective light sources of the plurality of light sources in a predetermined signaling light color.

7. The vehicle of claim 4 wherein the evaluation electronics unit is configured to activate the signaling unit in such a way that the optimum position is indicated by at least one light source of the plurality of light sources in a first predetermined signaling light color and at least one other position which is not the optimum position is indicated by at least one other light source of the plurality of light sources in a second predetermined signaling light color.

8. The vehicle of claim 1 further comprising:
   a door sensor unit configured to detect whether at least one cargo space hatch of the vehicle is in a closed state or an open state, wherein the door sensor unit generates an open signal during the open state;
   wherein the evaluation electronics unit determines the optimum position of the cargo in response to receiving the open signal.

9. The vehicle of claim 1,
   wherein the evaluation electronics unit is deactivated from determining the optimum position of the cargo in response to receiving a driving signal when the vehicle is in a driving operation.

10. The vehicle of claim 1 further comprising:
    a display unit arranged in a driver compartment of the vehicle configured to display information on a present loading state of the cargo space in response to loading signals received from the evaluation electronics unit.

11. The vehicle of claim 1 wherein the evaluation electronics unit is configured to monitor a present loading state of the cargo space during a driving operation of the vehicle and to generate a warning signal if the present loading state changes during the driving operation.

12. A method of balancing a cargo in a cargo space of a vehicle, comprising the steps of:
    sensing load forces at front and rear axles of the vehicle;
    determining a loading state of the vehicle in response to the load forces;
    determining an optimum position of the cargo in response to the loading state; and
    activating an optical signaling unit with a plurality of light sources arranged in the cargo space, wherein the light sources are activated in such a way that the optimum position of the cargo is indicated.

13. The method of claim 12 wherein the step of sensing load forces is comprised of measuring a movement of at least one wheel suspension of the vehicle.

14. The method of claim 12 wherein the step of sensing load forces is comprised of using an inertial measuring unit which detects movements of a sprung mass of the vehicle.

15. The method of claim 12 wherein the signaling unit is comprised of a light bar which is arranged in the cargo space extending in a longitudinal direction of the vehicle, wherein the light bar has the plurality of light sources arranged in series in relation to one another, wherein the light sources are configured such that at least two different light colors can be alternately generated, and wherein the optimum position is indicated by illuminating a single light source of the plurality of light sources with a predetermined signaling light color.

16. The method of claim 12 wherein the signaling unit is comprised of a light bar which is arranged in the cargo space extending in a longitudinal direction of the vehicle, wherein the light bar has the plurality of light sources arranged in series in relation to one another, wherein the light sources are configured such that at least two different light colors can be alternately generated, and wherein the optimum position is indicated by illuminating a subgroup of respective light sources of the plurality of light sources with a predetermined signaling light color.

17. The method of claim 12 wherein the signaling unit is comprised of a light bar which is arranged in the cargo space extending in a longitudinal direction of the vehicle, wherein the light bar has the plurality of light sources arranged in series in relation to one another, wherein the light sources are configured such that at least two different light colors can be alternately generated, wherein the optimum position is indicated by illuminating at least one light source of the plurality of light sources in a first predetermined signaling light color, and wherein at least one other position which is not the optimum position is indicated by illuminating at least one other light source of the plurality of light sources in a second predetermined signaling light color.

18. The method of claim 12 further comprising the step of:
detecting whether at least one cargo space hatch of the vehicle is in a closed state or an open state;
wherein the determining steps are performed when the hatch is in the open state.

19. The method of claim 12 further comprising the step of:
determining when the vehicle is in a driving operation;
wherein the determining steps are deactivated during the driving operation.

20. A vehicle defining at least one cargo space, comprising:
a sensor unit configured to determine load forces at front and rear axles of the vehicle;
an evaluation electronics unit configured to evaluate signals from the sensor unit to determine a loading state;
an optical signaling unit with a plurality of light sources arranged in the cargo space and electrically activatable by the evaluation electronics unit; and
a motor controller;
wherein the evaluation electronics unit is configured such that when a cargo is placed on a cargo surface of the cargo space then the evaluation electronics unit 1) determines an optimum position of the cargo in response to the loading state, and 2) activates the light sources in such a way that the optimum position of the cargo is indicated;
wherein the evaluation electronics unit is configured to generate a shutdown signal when the cargo is not positioned at the optimum position; and
wherein the motor controller is configured to turn off a motor of the vehicle after receiving the shutdown signal.

* * * * *